US009426139B1

(12) United States Patent
McClintock et al.

(10) Patent No.: US 9,426,139 B1
(45) Date of Patent: Aug. 23, 2016

(54) TRIGGERING A REQUEST FOR AN AUTHENTICATION

(71) Applicant: Amazon Technologies, Inc., Seattle, WA (US)

(72) Inventors: Jon Arron McClintock, Seattle, WA (US); Darren Ernest Canavor, Redmond, WA (US); George Nikolaos Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/673,609

(22) Filed: Mar. 30, 2015

(51) Int. Cl.
G06F 7/04 (2006.01)
H04L 29/06 (2006.01)
H04W 12/06 (2009.01)
G06F 21/31 (2013.01)

(52) U.S. Cl.
CPC ............... H04L 63/08 (2013.01); G06F 21/31 (2013.01); H04L 63/102 (2013.01); H04W 12/06 (2013.01)

(58) Field of Classification Search
USPC .................................. 726/3, 4, 30; 713/170
See application file for complete search history.

(56) References Cited

U.S. PATENT DOCUMENTS

| 8,508,338 | B1 | 8/2013 | Fiddy | |
|---|---|---|---|---|
| 8,621,209 | B1 | 12/2013 | Johansson et al. | |
| 8,631,129 | B2 | 1/2014 | Baumback et al. | |
| 8,631,472 | B1* | 1/2014 | Martin | H04L 63/08 709/204 |
| 8,762,526 | B2 | 6/2014 | Baumback et al. | |
| 8,782,741 | B1* | 7/2014 | L'Heureux | H04W 12/06 726/27 |
| 8,825,226 | B1 | 9/2014 | Worley, III et al. | |
| 8,843,625 | B2 | 9/2014 | Baumback et al. | |
| 9,185,095 | B1* | 11/2015 | Moritz | H04L 63/08 |
| 2004/0088260 | A1* | 5/2004 | Foster | H04L 63/08 705/64 |
| 2006/0294388 | A1* | 12/2006 | Abraham | G06F 21/305 713/182 |
| 2008/0184342 | A1* | 7/2008 | Carroll | H04L 63/102 726/4 |
| 2009/0044020 | A1* | 2/2009 | Laidlaw | H04L 63/08 713/176 |
| 2011/0099602 | A1* | 4/2011 | Apparao | G06Q 10/06 726/1 |
| 2014/0325223 | A1* | 10/2014 | Turgeman | H04L 63/1408 713/168 |
| 2015/0156171 | A1* | 6/2015 | Biswas | H04L 63/04 726/26 |
| 2016/0105290 | A1* | 4/2016 | Khalil | H04L 9/3271 713/176 |

OTHER PUBLICATIONS

Hess, "Determination of Authentication Mechanism," U.S. Appl. No. 14/671,946, filed Mar. 27, 2015, 59 pages.
Johansson, "Confidence-Based Authentication," U.S. Appl. No. 14/105,836, filed Dec. 13, 2013, 60 pages.
McClintock, "User Activity-Based Actions," U.S. Appl. No. 14/314,437, filed Jun. 25, 2014, 69 pages.

* cited by examiner

Primary Examiner — Amare F Tabor
(74) Attorney, Agent, or Firm — Klarquist Sparkman, LLP

(57) ABSTRACT

The present disclosure relates to multifactor-based authentication systems. Multifactor authentication occurs during a communication session in response to detecting a trigger event, such as an anomalous condition. Historical metrics, such as performance metrics (e.g., rendering speeds), behavioral metrics (e.g., click-stream behavior), environmental metrics (e.g., noise), etc., can be used as a baseline to compare against metrics for a current communication session. An anomalous condition, such as a current session metric exceeding a threshold, can result in an authentication service transmitting a multifactor authentication request.

19 Claims, 9 Drawing Sheets

TRIGGERING A REQUEST FOR AN AUTHENTICATION

BACKGROUND

Verifying the identity of a person or group of people, referred to as authentication, has many uses in the context of computing. People often have multiple user accounts—accounts in the operating systems of their computing devices, accounts with social networking sites, accounts with online retailers, and so on—that employ some type of authentication before access to the account is granted. In many cases, these accounts are configured to authenticate a user depending on whether the user provides a correct username and password combination. If the user provides a correct username and password, access to account resources is granted. If the user does not provide a correct username and password, access to account resources is denied.

Typically, authentication is performed by one or more of multiple factors. Example factors include: (1) something a user knows (e.g., a password), (2) something a user has (e.g., a physical key, card, bar code, mobile phone or certificate) and (3) something a user is (e.g., a person's physical characteristic such as DNA, iris, hand, skin texture, voice, face, fingerprint, blood vessel patterns, etc.). These three factors are often referred to as knowledge-based, token-based and biometric-based authentication factors, respectively. Demand for multifactor authentication systems that combine one or more of these factors is increasing because they present a higher obstacle to criminals. Such techniques are also becoming easier to implement thanks to the wide availability of mobile phones, PDAs and other such devices.

However, a delicate balance exists between security and disrupting a user's experience. For example, frequent attempts to request authentication can be frustrating to a user. As a result, multifactor authentication should be used judiciously.

DETAILED DESCRIPTION

The present disclosure relates to authentication systems, such as multifactor authentication. Multifactor authentication occurs during a communication session in response to detecting a trigger event, such as an anomalous condition. Historical metrics, such as performance metrics (e.g., rendering speeds), behavioral metrics (e.g., click-stream behavior), environmental metrics (e.g., noise), etc., can be used as a baseline to compare against metrics for a current communication session. An anomalous condition, such as a current session metric exceeding a threshold, can result in an authentication service transmitting a multifactor authentication request. A user must correctly respond to the multifactor authentication request in order to continue the communication session. The multifactor authentication request can occur at any time during the communication session and can appear random to the user of the client device. However, typically, the multifactor authentication is a result of a user action that is considered sensitive, such as attempting to access user account information, attempting to change a password, attempting to complete a purchase, etc. Typically, at the point of a multifactor authentication request, the user has already entered a username and password, so a first tier of authentication has already occurred. However, due to an anomalous occurrence, additional authentication can be desired.

Figure 1:
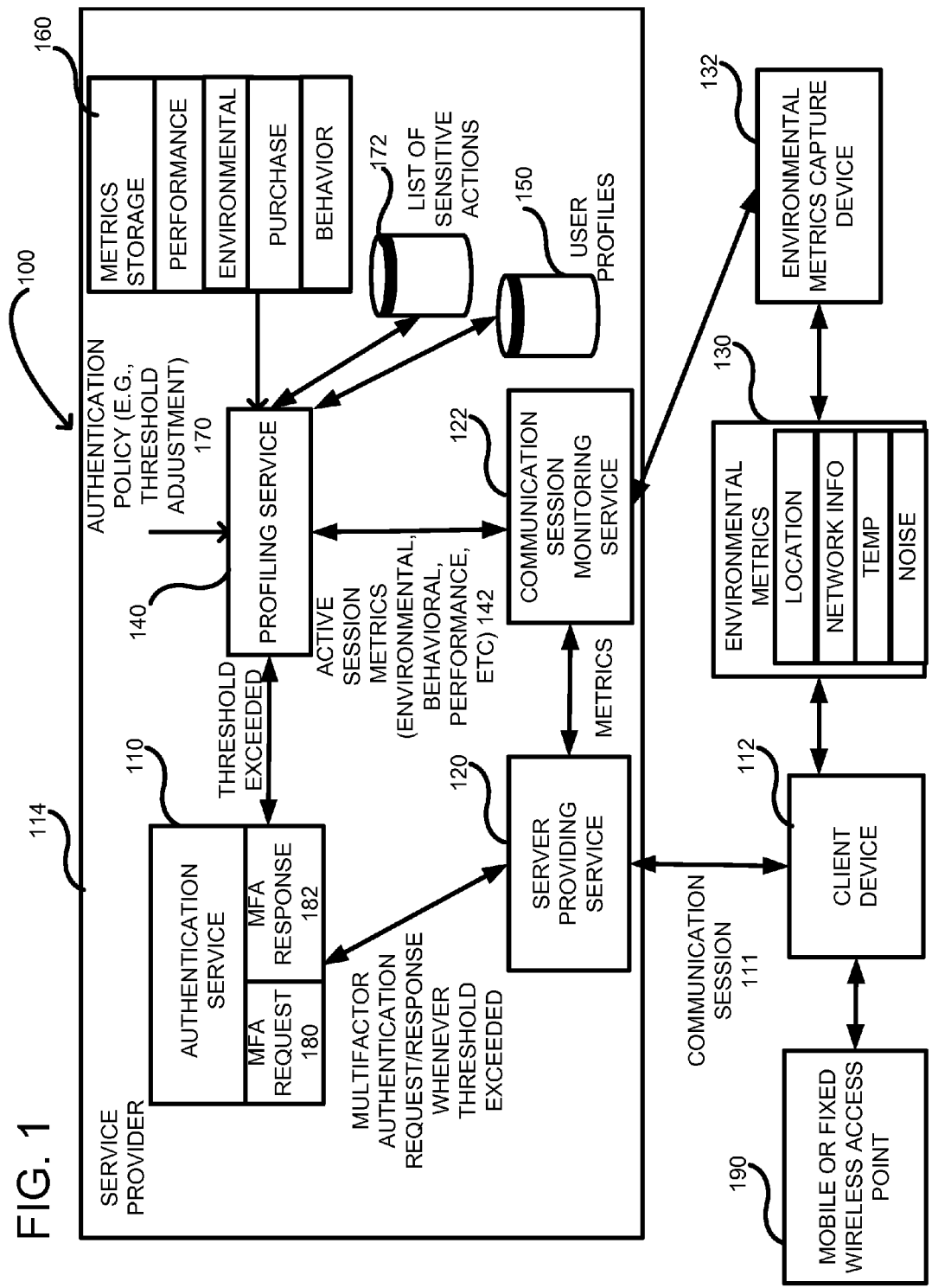
FIG. 1 is a system diagram of a service provider requesting multifactor authentication based on detected metrics from a user communication session.

With reference to FIG. 1, shown is a networked environment 100 according to various embodiments. An authentication service 110 can be used to request multifactor authentication or other authentication methods at various times during a communication session 111 between a client device 112 and a service provider 114. A network (not shown) (e.g., the Internet) allows for communication between the service provider 114 and the client device 112. The multifactor authentication request is typically the result of tracking metrics associated with the communication session and triggering the multifactor authentication as a result of detecting an anomaly. The anomaly is related to a metric that deviates from one or more metrics typically seen in a communication session between a user of the client device 112 and the service provider 114. The client device 112 can have multiple channels and the communication session 111 can be on one channel and the metrics passed from the client device 112 over another channel.

In the illustrated embodiment, the service provider 114 includes a server computer 120 providing a service, such as a Web service or any remote service, that is in communication with the client device 112. A communication session monitoring service 122 can monitor session metrics. Although the communication session monitoring service 122 is shown adjacent to the server providing the web service 120, it can be positioned prior to the server 120, such that communications pass through the monitoring service 122 before being received by the web service 120. Alternatively, port minors or other techniques for capturing network packets can be used. Examples of metrics can include performance metrics, behavioral metrics and environmental metrics. Performance metrics relate to speed of the communication session or operation of the client device, such as an amount of time for content from the server 120 to be rendered on the client device 112, network latency for the communication session 111, round-trip data transmission times for the communication session, etc. Environmental metrics relate to conditions surrounding the client device 112, such as noise, temperature, humidity, location, network information, etc., as are indicated at 130. The environmental metrics include data indicative of the physical environment in which the user may be present. The environmental data is acquired from one or more sensors. The sensors may include cameras, 3-D sensors, microphones, biomedical sensors, and so forth. For example, the environmental data may provide information indicative of how much movement the user is making during a given period of time, whether the user's eyes are open, that the user is physically present at a particular location, and so forth. Typically, the user's consent is given to authorize providing such information. The sensors may be controlled by the service provider 114, carried or worn by the user, and so forth. For example, the sensors may include accelerometers or other motion sensors which are worn on a wristband of the user or which are incorporated into a smart phone or tablet which the user carries with them. The environmental metrics 130 can be captured from the client device itself such as through GPS locators, microphones, temperature sensors, camera input, etc., or through a capture device 132. The capture device 132 can be a mobile capture device including a vehicle, such as a wheeled vehicle (e.g., a van) or a flying vehicle (e.g., a drone). An example capture device 132 is disclosed in U.S. Pat. No. 8,825,226, which is hereby incorporated by reference, and which relates to the use of automated mobile vehicles (e.g., drones) to provide coverage for inoperable infrastructure components at various locations in a building or outdoor environment. For example, a drone may be deployed to provide emergency lighting, a wireless network access point, audio (speakers), video, etc., within an event area. The event area may be indoors and/or outdoors. The capture device 132 can alternatively be another client device, such as one in the vicinity of client device 112. Still further, the capture device 132 can be a beacon or a similar device. As further discussed below, the capture device 132 can be used to capture any of the environmental metrics 130, which are proximate to the client device 112. Behavioral metrics relate to user behavior or how a user typically acts when interacting with the service provider 114, such as click-stream data, etc., how frequently a user attempts to log-in, etc. Other behavioral events may be associated with a time stamp or time window, as they may be regularly occurring events associated with the user identity. Further examples of behavioral events may include typing frequency, typing cadence, key-press duration, frequency of scrollbar use, and/or other behavioral characteristics that may be consistent for a user. Other observable behavior characteristics of the user that may be used for authentication may include user reading speed (e.g., the rate at which the user reads words), user walking gait (e.g., determined by an accelerometer or gyroscope), and so on.

Once various metrics for the active communication session 111 are captured by the monitoring service 122, such metrics can be passed to a profiling service 140 as shown at 142. The profiling service 140 can use the active session metrics to generate profiles associated with the user of the client device. The profiles describe typical characteristics or preferences of the user of the client device 112, such as the performance metrics associated with the client device itself, behavioral preferences of the user, or environmental metrics describing environmental information about the client device. As further described below, the metrics can be saved in association with time. Additionally, the metrics can be scaled so that different metrics can be viewed on a same graph. Once generated, the user profile can be stored with other user profiles in storage 150. In a typical communication session, the profiling service 140 has a customer identifier and uses that identifier to obtain a user profile from the storage 150. The retrieved user profile can then be supplemented using the active session metrics and then restored in the storage 150 for future use. The profiling service 140 can also use other metric data 160, such as historical performance data associated with the user, historical environmental data associated with past user communication sessions, prior purchase history of the user, or historical user behavior, to build a user profile. The profiling service 140 can use machine learning to establish the thresholds and/or determine when an authentication should be triggered.

Using the active session metrics 142 together with the stored user profile 150 and/or the historical metrics 160, the profiling service 140 can generate or supplement a user profile. Additionally, thresholds can be set using an input policy 170 or other predetermined parameters. The policy 170 can be controlled by an administrator of the service provider 114. The profiling service 140 can also retrieve a list of sensitive actions from a storage 172. The list of sensitive actions can be used by the profiling service to alert the profiling service that multifactor authentication may be needed. Example sensitive actions include attempting to access user secured information, particularly account information. The list of sensitive actions can be modifiable by a system administrator or an end user, such as a user of the client device 112. The sensitive actions and thresholds 350, 352 can be machine learned (e.g., machine-learning may include clustering algorithms, combining multiple learning algorithms, dimensionality reduction algorithms, regression analysis, etc.). The data gathered from the specific customer, general customers, and external sources and/or the data stored in the user profile store 150 may be used as inputs in a machine learning algorithm or concept in order to best model or determine specific actions/thresholds that should be labeled as sensitive actions. Different machine learning concepts may be applied to the user behavior data in order to determine a best mechanism or device type to proactively provide the user with the authentication information necessary. For example, when behavior data is being used on a user-specific statistical model, the machine learning concepts to be implemented may be a regression model, a simple linear logistic model, or a logistic regression model, which may model the likelihood that the action should be marked a sensitive action or a threshold should be set to a specific level.

In example embodiments, more complex machine learning concepts, such as Naive Bayes classifiers, neural networks, random forests, or ensemble learning methods may be used when applying multiple users' behavior data and/or external data to the model. For example, when large amounts of user behavior data exists, such as multiple inputs from multiple customers, neural networks or more robust machine learning algorithms may be employed in order to train or teach the statistical model based on a larger amount of user/customer behaviors.

If one of the active session metrics 142 exceed a threshold set by the profiling service 140, an alert can be sent from the profiling service 140 to the authentication service 110. In some embodiments, to prevent excessive notifications, the profiling service 140 can check whether a threshold is exceeded only for actions that are considered sensitive from the storage 172. In response to the notification from the profiling service 140, the authentication service 110 can generate a multifactor authentication request 180. Such a request can be to the client device 112 through the web service 120 or can be passed directly to the client device 112, such as through an endpoint.

In conjunction with the multifactor authentication request 180, the authentication service 110 can generate an action used with the request. For example, a mobile or fixed wireless access point 190 can receive the action and in response thereto, assist with the authentication. For example, the device 190 can be a vehicle, such as a drone (e.g., see U.S. Pat. No. 8,825,226) or wheeled vehicle that moves to the location of the client device 112 and includes a wireless access point to which the client device can connect. Alternatively, the access point 190 can be a fixed location near the client device. In either case, network information (e.g., MAC address or SSID) can be accessible by the client device 112 and the multifactor authentication request 180 can ask for such network information to confirm the client device 112 is authentic. The device 190 can include one or more measurement devices, such as to measure environmental metrics 130. Once the user answers the multifactor authentication request, the response 182 is checked by the authentication service 110. If the response is correct, then the authentication service 110 instructs the web service 120 to perform the action. Alternatively, if the response is incorrect, the authentication service 110 can instruct the web service to block the action. The service provider 114 could also use the techniques in U.S. patent application Ser. No. 14/671,946 to decide which of several factors could be used. The '946 app. relates to a multi-factor authentication service that utilizes a statistical model to select which of several authentication mechanisms to use for a second authentication factor. The multi-factor authentication service uses past user behavior (e.g., whether the user never uses a particular authentication method from a certain location due to a lack of connectivity) as input criteria for the statistical model. This allows the authentication service to provide secondary authentication codes to users in a way that is the most helpful to the users.

Figure 2:
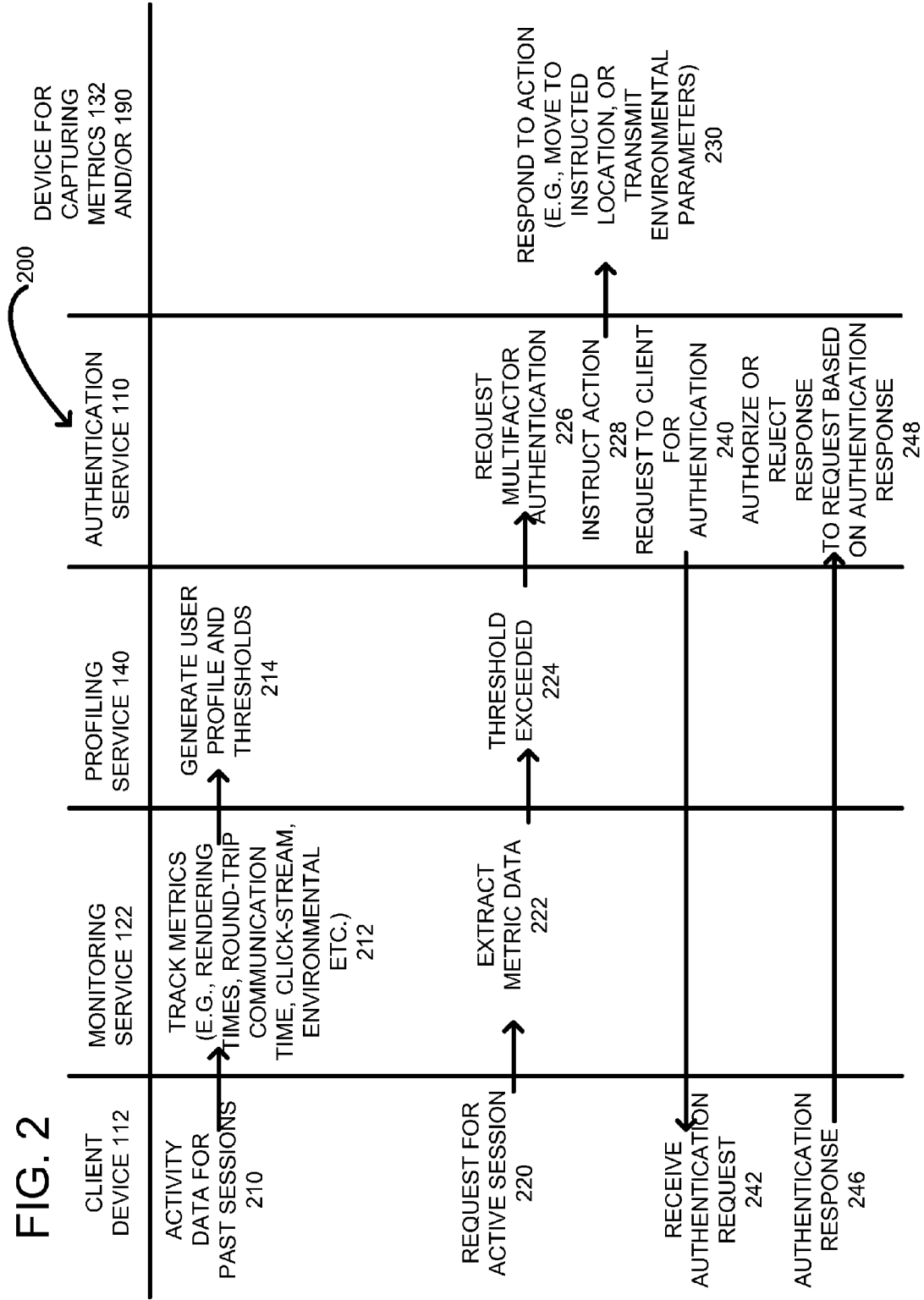
FIG. 2 shows a communication flow between components of FIG. 1 to perform the multifactor authentication.

FIG. 2 is an embodiment showing communication flow 200 between the components of FIG. 1, including the client device 112, the monitoring service 122, the profiling service 140, the authentication service 110, and a device for capturing metrics (132 and/or 190). At 210, the client device 112 transmits activity data to the service provider, such as click-stream data. The click-stream data is associated with a path that the user takes while browsing a Web site. Each distinct selection made on a Web page adds one click to the click stream. Metrics associated with the click stream can be captured using the monitoring service 122. The metrics include a click speed, which is a maximum interval between the first and second time a user presses a button on a mouse or other pointing device, a time for a round-trip communication from the service provider to the client device and back, a rendering time associated with transmitting content from the service provider to the client and having the content rendered on the client device, environmental metrics, etc. The monitoring service can passively monitor communications between the client device 112 and the Web service 120 (such as by using a port minor), or it can actively receive the network packets between the client device and the Web service and retransmit the packets. In either case, the monitoring service can access network packets in the communication session between the server 120 and the client device 112. The profiling service 140 can receive the captured metrics and generate user profiles and thresholds 214 associated with those profiles. A single baseline profile can be generated for the user or different profiles can be associated with the different metrics. The communications or actions 210, 212 and 214 represent historical data for past communication sessions that have terminated and allow characteristics associated with a user to be generated.

An active communication session starts at 220 wherein a request is made from the client device 112 to the Web service 120. The monitoring service 122 can extract metric data at 222 and transmit the metric data to the profiling service 140. The profiling service can determine that a metric threshold has been exceeded at 224 and transmit the same to the authentication service 110. Alternatively, the authentication service 140 can request to the profiling service whether a threshold has been exceeded. Thus, the interaction between the authentication service and the profiling service can be a push- or pull-type communication. In response to the threshold being exceeded, the authentication service can request multifactor authentication 226. Based on a type of authentication, the authentication service can also instruct a separate device to perform an action 228. For example, a device, such as a device 132 of FIG. 1, can be used by instructing it to move to a location of the client device and transmit current environmental parameters. Other types of authentication do not require such a command to the device 132. At 240, a request for authentication is sent to the client device. Different types of authentication for different activities can be used, and the user and/or service provider can select which one to use for various activities. For example, there can be a first plurality of types of categories and a second plurality of ways to authenticate the service provider can define the categories and let the user select which one(s) to use. Techniques described in the above-referenced '946 application can be used to select the multifactor authentication technique. The client device receives the request for authentication at 242 and transmits the response 246. At 248, the authentication service can either confirm or reject the authentication, which results in either allowing or disallowing a response to the request 220. The ordering of events in FIG. 2 is merely an example and other orderings can be used. Additionally, not all of the steps need be performed or additional steps can be added.

Figure 3:
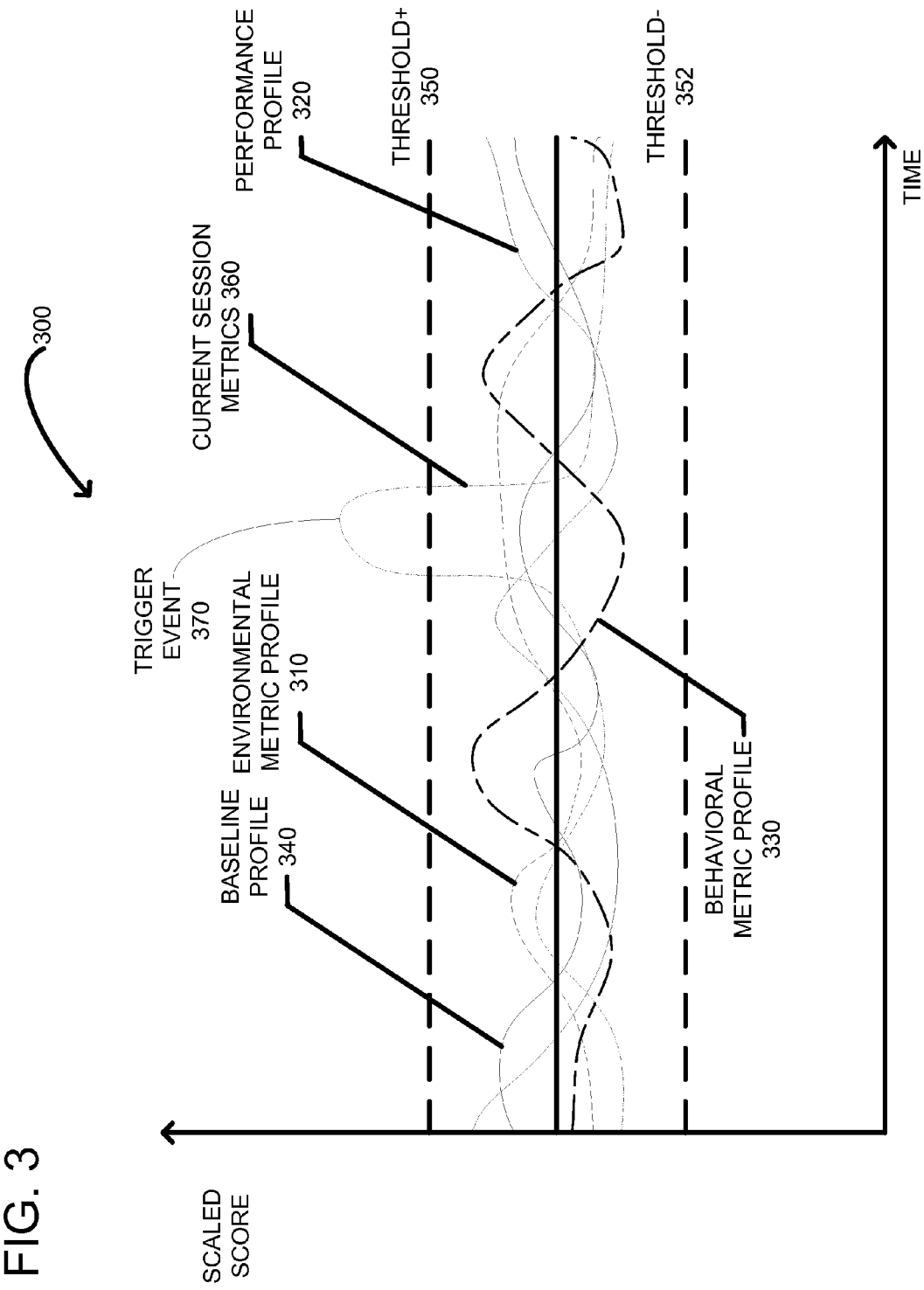
FIG. 3 shows potential profiles used to detect an anomalous condition in a current communication session.

FIG. 3 is an illustrative graph 300 depicting profiles derived from communication session metrics or other data based on a scaled Y-axis and a time-based X-axis. The profiles can be used to determine when an anomalous event occurs. The profiles can be based on a plurality of different metrics, each generating a separate profile or a combination of metrics. For example, an environmental profile 310 can include environmental data at or near the client device 112, and can include location metrics, network metrics, temperature metrics, noise metrics, etc. A performance profile 320 can relate to performance data of the client device or the network. Examples include speed-related metrics (rendering, packet transmission, etc.) associated with the network or the client device itself. A behavioral metric profile 330 relates to user behavior such as user click-stream data. One or more of these profiles can be combined to generate a baseline profile 340, if desired. Using one or more of the profiles, thresholds 350, 352 can be generated. For example, the thresholds can be generated by taking a mean or average of a profile and then calculating a percentage deviation from the mean or average. How the thresholds are calculated can be controlled through a policy document, such as is shown at 170 in FIG. 1. Although only two thresholds are shown, any number of thresholds can be used, such as a different threshold for each metric. Additionally, composite metrics can be used.

A current session metric 360 is shown and represents metrics captured during an active communication session between the client device and the service provider. At a certain point in time, one or more of the metrics exceeds a threshold as indicated at 370, creating a trigger event. The trigger event can result in a communication to the authentication service so that a multifactor authentication is generated. In some embodiments, exceeding a threshold only generates a trigger event if the user attempts a sensitive action during the current communication session. In this way, the user can continue making requests in a communication session for routine actions that do not compromise account information, for example.

A hysteresis function may be used to generate the baseline profile 340. For example, the baseline profile may comprise environmental metrics profile data 310, performance profile metric data 320, behavioral metric profile data 330, as well as other metric data. The baseline profile 340 may be specific to a user, or may be based on information acquired from a plurality of users. In comparison, a current profile 360 is indicative of the current state of a single user, such as provided by the current state metric data.

Figure 4:
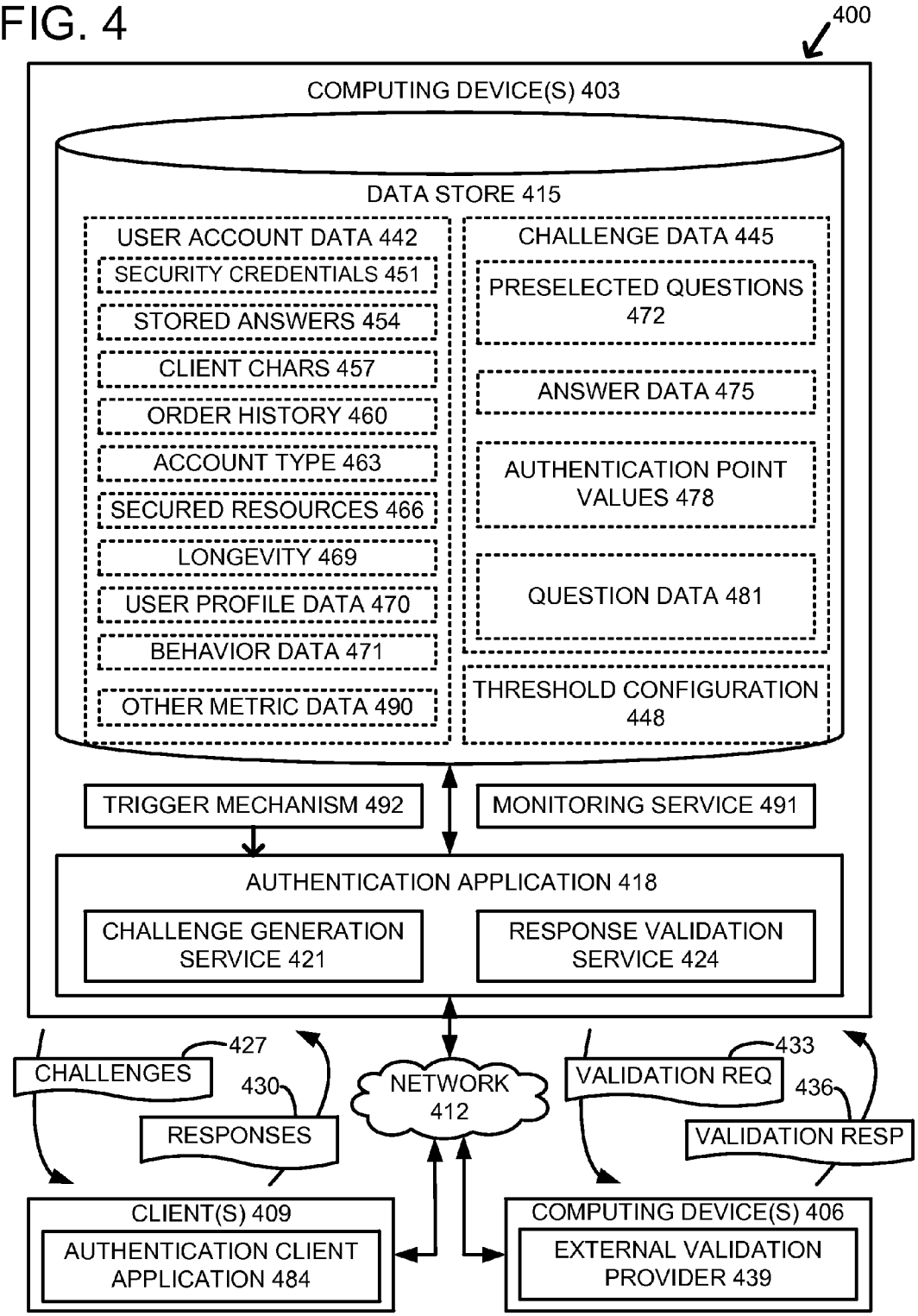
FIG. 4 is shows another embodiment of the system for requesting multifactor authentication based on detected metrics.

FIG. 4 shows another embodiment for providing multifactor authentication. With reference to FIG. 4, shown is a networked environment 400 according to various embodiments. The networked environment 400 includes one or more computing devices 403 in data communication with one or more computing devices 406 and one or more clients 409 by way of a network 412. The network 412 includes, for example, the Internet, intranets, extranets, wide area networks (WANs), local area networks (LANs), wired networks, wireless networks, or other suitable networks, etc., or any combination of two or more such networks.

The computing device 403 may comprise, for example, a server computer or any other system providing computing capability. Alternatively, a plurality of computing devices 403 may be employed that are arranged, for example, in one or more server banks or computer banks or other arrangements. For example, a plurality of computing devices 403 together may comprise a cloud computing resource, a grid computing resource, and/or any other distributed computing arrangement. Such computing devices 403 may be located in a single installation or may be distributed among many different geographical locations. For purposes of convenience, the computing device 403 is referred to herein in the singular. Even though the computing device 403 is referred to in the singular, it is understood that a plurality of computing devices 403 may be employed in the various arrangements as described above.

Various applications and/or other functionality may be executed in the computing device 403 according to various embodiments. Also, various data is stored in a data store 415 that is accessible to the computing device 403. The data store 415 may be representative of a plurality of data stores 415 as can be appreciated.

The components executed on the computing device 403, for example, include an authentication application 418 and other applications, services, processes, systems, engines, or functionality not discussed in detail herein. The authentication application 418 is executed to authenticate users in order to authorize access to secured resources. To this end, the authentication application 418 may include a challenge generation service 421, a response validation service 424, and/or other components. The challenge generation service 421 is configured to generate a set of authentication challenges 427, which are presented to the user at the client 409. The authentication challenges 427 may correspond, for example, to knowledge-based questions, prompts for face recognition, prompts for voice recognition, prompts for fingerprint recognition, and/or prompts for security credentials.

Responses 430 to one or more of the challenges 427 are obtained from the client 409, and then evaluated by the response validation service 424. The response validation service 424 is configured to determine whether the response 430 to a challenge 427 is correct. In some cases, the response validation service 424 may submit validation requests 433 to, and receive validation responses 436 from, an external validation provider 439 executed in the computing device 406. Depending on the correct or incorrect responses 430 that are provided, a confidence score is generated by the authentication application 418. If the confidence score meets a minimum confidence threshold, access to one or more secured resources is authorized for the user at the client 409. If the confidence score does not meet the minimum threshold, additional challenges 427 may be generated and presented to the user. If the confidence score falls beneath a negative confidence threshold, access to any secured resource of the account may be denied.

The data stored in the data store 415 includes, for example, user account data 442, challenge data 445, threshold configuration data 448, and potentially other data. The user account data 442 includes data associated with various user accounts for which the authentication application 418 performs authentication. The user account data 442 may include, for example, security credentials 451, stored answers 454, client characteristics 457, order history 460, an account type 463, secured resources 466, information about longevity 469, user profile data 470, behavior data 471, and/or other data 490. The security credentials 451 may include passwords, hashes of passwords, public-key encryption data, data to validate one-time passwords, data to validate personal identification number (PIN) values, biometric identity data, and/or other data. The stored answers 454 may include stored valid answers to preconfigured authorization challenges 427, or their hash values, which are stored as a result of forced or voluntary knowledge-based question enrollment.

The client characteristics 457 may define various characteristics associated with the clients 409 employed by users of the respective account. Such client characteristics 457 may include unique device identifier information, cookie information, client 409 locations (e.g., ZIP codes, global positioning system (GPS) location coordinates, geolocation results, etc.), internet protocol (IP) addresses, wireless base stations (e.g., cell stations, wireless network access points, etc.) employed by the client 409, whether a specific hardware module has been used in connection with the respective client 409, and/or other characteristics that may be associated with use of the clients 409. The order history 460 may correspond to a purchase or transaction history for products, services, downloads, and/or other items associated with the user account. For example, the user account may correspond to an account with a merchant or electronic marketplace for which a purchase history may be available. The order history 460 may include transaction data associated with purchase transactions, account enrollment transactions, etc.

An account may be associated with one or more account types 463 from a selection of multiple account types 463. For example, a user account may be for a customer, a merchant, a developer, a payments clerk, a system administrator, and so on. Different types of accounts may be associated with different privileges and may be subject to varying levels of security. The secured resources 466 may correspond to various resources to which the user may gain access through authentication. As non-limiting examples, the secured resources 466 may include a directory or file system in a networked storage system, an email account, a password change or reset utility, an order management portal for merchants, an order management portal for customers, and/or other resources. Moreover, in various embodiments, the secured resources 466 may correspond to tangible resources for which physical access is controlled by the authentication application 418. Non-limiting examples of such tangible resources may include building doors, locks, physical safes, and so on.

The information about longevity 469 may describe how long the corresponding user account has been active, creation date for user account, and/or other information. Values may describe the longevity 469 for various configuration settings in the user account such as billing addresses, telephone numbers, etc. The user account data 442 may include other information such as social security numbers or portions thereof, payment instrument information, demographic information, mailing addresses, physical addresses, etc.

The user profile data 470 may include biometric characteristics of one or more users associated with the account. Such characteristics may enable facial recognition, fingerprint recognition, voice recognition, and so on, of the user. To this end, the user profile data 470 may include stored samples from audio of the user's voice, stored samples from the user's image, characteristics derived from the user's voice, facial image, fingerprint image, user heart rate, user body temperature, user handwriting, and so on. The user profile data 470 may also record unique identifiers associated with the user's clothing (e.g., from radio-frequency identifiers (RFIDs) or other identifiers embedded in the user's clothing). In some cases, the user may have a surgically implanted unique identifier or other physical identifier that is uniquely associated with the user. The profile data 470 can further include typical environmental characteristics associated with the user, such as how much background noise is present during communication sessions, temperature information associated with the user during a communication session, geographical location, etc. The user profile data 470 can further include performance data, such as rendering times, latency times, system speed, etc. The user profile data 470 may record such identifiers for purposes of authentication. The user profile data 470 may be used by the response validation service 424 and/or the external validation provider 439 to validate biometric responses 430 to challenges 427.

The behavior data 471 may include data corresponding to behavioral events that have been observed as being performed by an authenticated user in one or more user sessions. Such behavioral events may be associated with a time stamp or time window, as they may be regularly occurring events associated with the user identity. Such behavioral events may include recorded behaviors that are performed, and may be monitored, client side, such as typing frequency, typing cadence, key-press duration, frequency of scrollbar use, and/or other behavioral characteristics that may be consistent for a user. Other observable behavior characteristics of the user that may be used for authentication may include user reading speed (e.g., the rate at which the user reads words), user walking gait (e.g., determined by an accelerometer or gyroscope), and so on. Various dimensions to the behavioral events may include categories of items purchased, locations of the client 409, and at which times of the day or times of the year a network site is accessed or a behavioral event is completed. Any other metric data can also be included and associated with the user account as indicated at 490.

The challenge data 445 includes data relevant to the generation of challenges 427 by the challenge generation service 421 and the validation of responses 430 by the response validation service 424. The challenge data 445 may include, for example, preselected questions 472, answer data 475, authentication point values 478, question data 481, and/or other data. The preselected questions 472 may correspond to questions that are preselected by the user and/or the authentication application 418 through, for example, forced or voluntary enrollment. The preselected questions 472 may have corresponding stored answers 454 associated with the user account data 442 of the user.

The answer data 475 may include data used to validate responses 430 involving knowledge-based questions by the response validation service 424. The authentication point values 478 are assigned to each challenge 427 generated by the challenge generation service 421. The authentication point values 478 are employed to weight the responses to the challenges 427 in generating confidence scores. The question data 481 is used to create question challenges 427 that are designed to elicit an incorrect response from invalid users. For example, a question challenge 427 may include four multiple choice answers including a "none of the above" choice, where "none of the above" is the correct answer.

The threshold configuration data 448 specifies the minimum confidence thresholds for confidence scores which are employed in various situations before a user is authenticated. For example, the minimum confidence threshold may differ based at least in part on the account type 463, the secured resources 466 to be accessed, the longevity 469 of the account, and/or other factors. Additionally, the threshold configuration data 448 may specify negative confidence thresholds and/or inverse confidence thresholds that are used to determine a confidence that the user is not associated with the account.

A monitoring service 491 can analyze metrics from a current communication session between computing device 403 and client device 409. Performance metrics, environmental metrics, behavioral metrics, etc. can be captured directly from the client device 409 or from other devices. The monitoring service 491 can be established at any point in the communication path between the device 403 and the client 409 in order to capture network packets being passed there between. Alternatively, a mirror device can be positioned between the computing device 403 and the client device 409 so as to copy network packets between computing device 403 and client device 409 and transmit the copied packets to the monitoring service 491. The monitoring service 491 can be coupled to a triggering mechanism 492. The triggering mechanism 492 can use the metrics from the monitoring service 491 and past metrics from the user account 442 to generate a trigger condition when an anomaly occurs, such as when a threshold is exceeded. The trigger condition causes the authentication application 418 to request a multifactor authentication as described herein. In some embodiments the trigger mechanism can be a profiling service, as was described in FIG. 1, but in other embodiments the trigger mechanism 492 includes a comparison engine that compares current metrics to stored data to determine if an anomalous condition exists that merits transmission of a multifactor authentication.

Figure 5:
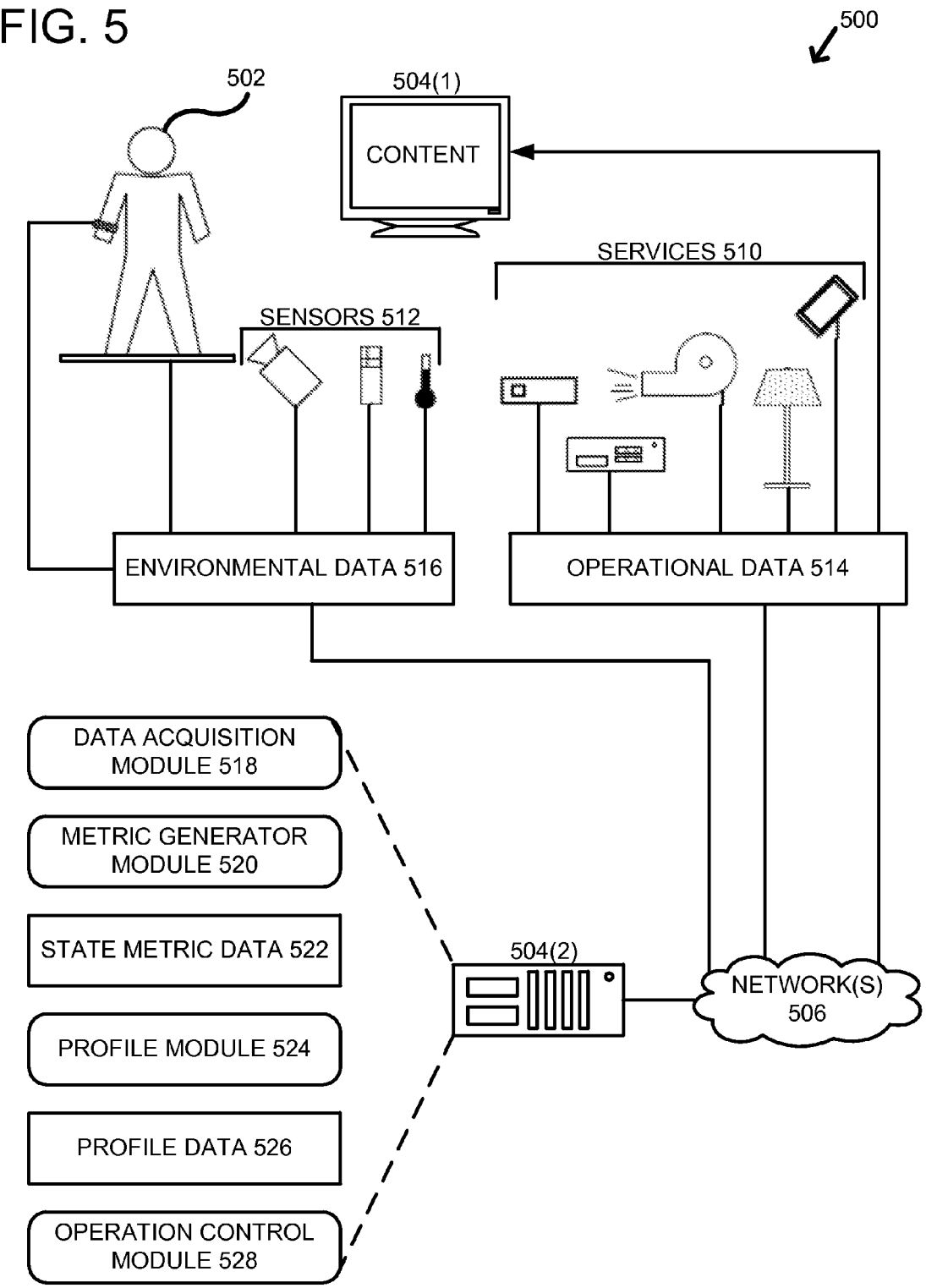
FIG. 5 shows example metrics that can be captured for detecting an anomalous condition in a current communication session.

FIG. 5 shows a system 500 for capturing metric data, including environmental and behavioral data that can be used in the above-described embodiments. One or more users 502 may be present at a facility such as a dwelling, office, factory, and so forth. One or more computing devices 504(1) may provide or control one or more services to, or in support of, the user 502. The computing devices 504 may include televisions, tablet computers, personal computers, electronic book readers, gaming consoles, set-top boxes, media players, in-vehicle entertainment systems, smartphones, servers, device control systems, and so forth. The computing devices 504 may couple to one or more networks 506. The networks 506 may include public networks, private networks, or a combination thereof. The networks 506 may include, but are not limited to personal area networks (PANs), local area networks (LANs), wide area networks (WANs), and so forth. The networks 106 may communicate using Ethernet, Wi-Fi™, Bluetooth®, ZigBee®, 3G, 4G, or other technologies.

The system 500 may include one or more service devices 510 and one or more sensors 512. The service devices 510 may include computing devices 504, utility monitoring or control systems, heating ventilation and air conditioning (HVAC) systems, household appliances, home automation systems, security systems, irrigation control systems, exercise equipment, and so forth. For example, the service devices 510 may include a router for the network 506, room lights which are part of a pervasive network of interconnected devices that are uniquely identifiable also known as an Internet of Things (TOT), and so forth. The service devices 510 may be locally present within a facility or may be at another location. For example, the household appliances may be local to the user's 502 home, while the computing device 504, such as a server running a parcel delivery dispatch system, may be located remotely and accessible by way of the network 506.

The service devices 510 are configured to provide or support the provisioning of a service for the user 502, or in support of the user 502. In some implementations, the service may involve the transport, delivery, or processing of a good or commodity. For example, the service devices 510 may include the parcel delivery dispatch system mentioned above, delivery trucks themselves, autonomous vehicles, or other mechanisms used to deliver a good to the user 502.

In some implementations the service devices 510 may include or have access to sensors 512 which may provide information about the performance of the service devices 510, the interaction of that service device 510 (or a subsidiary component) with the surrounding environment, or other service devices 510. For example, where the service device 510 comprises a refrigerator, a switch may be used to detect that the door of the refrigerator is open.

The service devices 510 may be configured to provide operational data 514. The operational data 514 provides information indicative of the operation, status, and so forth of the service device 510 (i.e., behavioral metrics). For example, the operational data 514 may comprise information about processor loading, memory availability, currently executing processes, and so forth of the computing device 504. In another example, the operational data 514 may comprise information from a home automation system indicative of which lights in a home are active and the intensity level of those lights. In yet another example, the operational data 514 may comprise information from a security system indicating times and identification of doors or windows which have been opened and closed. The operational data 514 may comprise information which is solely indicative of operation of the service device 510, or may also include information indicative of how the user 502 is interacting with the service device 510. For example, the operational data 514 may comprise information indicating that the user 502 has logged into the computing device 504, is using the network 506 to transfer data with a remote computing device, and so forth. Other performance metrics can also be associated with the operational data.

The operational data 514 may include information indicative of the type of service. For example, types of service may specify data processing, physical delivery, utility delivery, transportation, and so forth. Similarly, the operational data 514 may include information indicative of a type of device providing the service. One or more of a start time of use of the service, duration of use of the service, end time of use of the service, and so forth may also be included in the operational data 514. Operational data 514 associated with a computing device 504 may include information such as data transfer rate with regard to the network 506, number of processor cycles used, number of input/output operations, memory used, and so forth.

The sensors 512 generate environmental data 516. The sensors 512 may be located at different points within the facility, may be carried by the user 502, worn by the user 502, implanted within the user 502, or a combination thereof. For example, the sensors 512 may be mounted on the walls or furniture of the facility. In another example, the sensors 512 may be part of an implanted medical device such as a pacemaker or insulin pump. The sensors 512 provide information about the user 502 and how they are interacting with or present in the environment of the facility. For example, the sensors 512 may provide information about the presence of the user 502 in the facility, location of the user 502 within the facility, pose of the user 502, or activity of the user 502. The pose of the user 502 may include the physical configuration of one or more body parts in relation to one another or an object in the facility. The pose of the user 102 may include whether the user's 502 eyes are open or closed, overall orientation of the user's 502 body such as whether standing, sitting, lying down, and so forth. The activity of the user 502 provides information indicative of an extent or nature of physical movement of one or more limbs, torso, head, and so forth. Activities of the user 502 may include the user 502 moving about such as walking, the user 502 speaking, or the user 502 performing one or more tasks with a computing device 504 such as typing on a keyboard, using a touch sensor, watching a display device, and so forth. Other environment data 516 may include a count of a number of users 502 present at the facility or a portion thereof. In some implementations actual or approximate ages of the users 502 may be determined. For example an analysis of images of the users 502 may be used to generate an approximate age of the users 502, estimate gender, and so forth.

The sensors 512 may include cameras, microphones, weight sensors, and so forth. The environmental data 516 comprises information resulting from the sensors 512. For example, where the sensor 512 comprises a camera, the environmental data 516 may comprise image data from the camera.

A server or other computing device 504(2) is coupled to the network 506 and is in communication with one or more of the other computing devices 504(1), the service devices 510, the sensors 512, and so forth. The server may comprise one or more physical computing devices, virtual computing devices, or utilize a combination thereof. The server or other computing device 504(2) may include one or more modules and data including but not limited to: a data acquisition module 518, a metric generator module 520, state metric data 522, a profile module 524, profile data 526, or an operation control module 528.

The data acquisition module 518 is configured to acquire the operational data 514, the environmental data 116, or both. The data acquisition module 518 may be configured to accept data as "pushed", or may be configured to "pull" data from the service devices 510, sensors 512, or other devices. In some implementations the data acquisition module 518 may perform filtering, preprocessing, or other data preparation or analytics. For example, the data acquisition module 518 may be configured to process image data and provide user identification based on facial characteristics. In another example, the data acquisition module 518 may be configured to process audio data from a microphone to categorize sounds as speech, laughter, snoring, and so forth. The data acquisition module 518 and other modules described herein can be used as a source into the communication session monitoring service 122 (FIG. 1) or the metrics storage 160 (FIG. 1) so that the embodiment of FIG. 5 can be integrated into the embodiment of FIG. 1.

The metric generator module 520 is configured to use the operational data 514, environmental data 516, or both to generate state metric data 522. The state metric data 522 may comprise a score or numeric value which is indicative of a level or type of activity as performed by the user 502, the service device 510, or a combination thereof.

The metric generator module 520 utilizes one or more techniques to generate the state metric data 522. These techniques may be based at least in part on the type of data. For example, the metric generator module 520 may receive accelerometer data from a sensor 512 worn by the user 502. The accelerometer data may provide information indicative of the movements of the user 502. For each movement of the user 502 which exceeds a threshold acceleration and duration, a counter may be incremented. As a result, the metric generator module 520 may process the accelerometer data and generate user state metric data 522 comprising a numeric value which indicates how much the user 502 is moving. In some implementations the score may be normalized or other data processing operations performed.

The metric generator module 520 may generate state metric data 522 based at least in part on historical data. Historical data may comprise information such as operational data 514, environmental data 516, or both which have been acquired previously. For example, the historical data may be acquired over the previous hour, day, week, month, year, and so forth. In some implementations, the metric generator module 520 may generate particular scores associated with particular sensors 512, and service devices 510. For example, an environmental score may be generated based on the environment data 516, while an operational score may be generated based on the operational data 514.

The profile module 524 is configured to generate profile data 526 which is indicative of a level of user 102 activity over a period of time, sequence of operations, and so forth. The profile module 524 may use one or more of the operational data 514, the environmental data 516, or the state metric data 522 to generate profile data 526. For example, the profile module 524 may use state metric data 522 which provides information about a span of time to build a time series which indicates the level of activity over time. The level of activity may be of the user 502, the service devices 510, or combination thereof. For example, profile data 526 may be generated for one of the service devices 510, indicating that the level of activity associated with that service has increased or decreased over time. In another example, profile data 526 may be generated for the user 502, such as indicating when the user 502 is very inactive such as sleeping, active such as while working, or very active such as while exercising. In some implementations the profile data 526 may comprise an aggregate or combination of the activity levels of the user 502 and the service devices 510. The profile data 526 may incorporate a hysteresis function, such that the output is dependent at least in part on a previous input. The hysteresis function may prevent the profile data 526 from high-amplitude changes in value due to transient or "spike" events.

The profile module 524 may be used to generate baseline profile data 526. The baseline profile data 526 provides a reference against which an individual level of activity may be compared to categorize the level of activity. The profile module 524 may use data from a plurality of facilities, users 502, or both to generate a standardized or initial baseline profile data 526. For example, users 502 may be sorted according to one or more common demographics such as age, place of residence, occupation, and so forth, and the operational data 514 and environmental data 516 from these users 502 may be combined and used to build baseline profile data 526. In one implementation, the profile data 526 may be expressed as a time series such as scores over time. In another implementation, the profile data 526 may be expressed as scores with respect to specific events or conditions. For example, the profile data 526 may be expressed as a score contemporaneous with activation of the computing device. In other implementations the profile data 526 may be expressed using other data structures or formats.

The profile module 524 can be used as the profiling service 140 of FIG. 1 so as to generate profile data as exhibited in FIG. 3. The profile data 526 can be stored as one or more user profiles in the storage 150 of FIG. 1. Any of the above-described metrics of FIG. 5 can be incorporated and used in the other embodiments described herein so as to generate a trigger condition when an anomalous condition exists.

The operation control module 528 may be configured to analyze the state metric data 522, the profile data 526, or a combination thereof to determine one or more operations to be performed. In some implementations this analysis may include determining ratios using the state metric data 522. For example, a ratio of an environmental score to an operational score may be determined which indicates typical activity of the user 502 and the service devices 510 providing services to the user 502. Should anomalous activity take place, the ratio may deviate from a particular value. For example, where the operational score is very high and the environmental score is very low, the low ratio resulting from this may be indicative of anomalous activity.

Based at least in part on the analysis, the operation control module 528 may generate instructions, issue commands, or otherwise affect operation of the computing device 504(1). For example, the detection of the anomalous condition can cause the trigger mechanism 492 of FIG. 4 to communicate with the authentication application 418 so as to generate a multifactor authentication.

Figure 6:
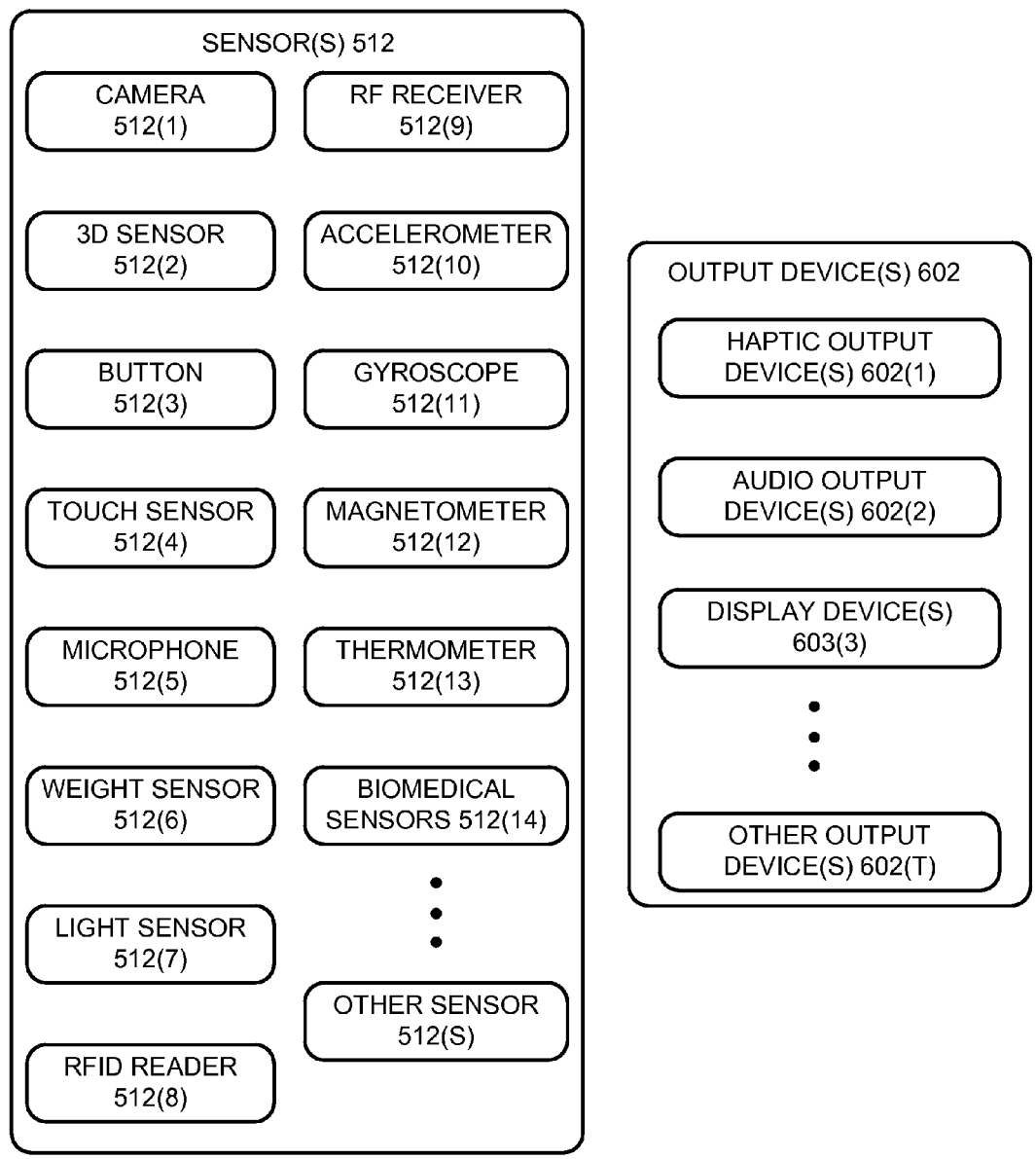
FIG. 6 shows different sensors and output devices that can be used in requesting multifactor authentication.

FIG. 6 illustrates a block diagram 600 of sensors 512 and output devices 602 that may be used by any of the embodiments described herein. As described above, the sensors 512 may generate environmental data 516, which may then be provided to the data acquisition module 518. The sensors 512 may include one or more cameras 512(1). These cameras 512(1) may include imaging sensors configured to acquire images of a scene. The imaging sensors are configured to detect light in one or more wavelengths including, but not limited to, terahertz, infrared, visible, ultraviolet, and so forth. The imaging sensors may comprise charge coupled devices (CCD), complementary metal oxide semiconductor (CMOS) devices, microbolometers, and so forth. The metric generator module 520 may use image data acquired by the cameras 512(1) during operation of the facility. For example, the metric generator module 520 may identify the user 502, determine how much the user 502 is moving, determine whether the user's 502 eyes are open or closed, and so forth based at least in part on their appearance within the image data acquired by the cameras 512(1).

One or more 3D sensors 512(2) may also be included in the sensors 512. The 3D sensors 512(2) are configured to acquire spatial or three-dimensional data, such as distance, 3D coordinates, point cloud, and so forth about objects within a sensor field-of-view. The 3D sensors 512(2) may include range cameras, lidar systems, sonar systems, radar systems, structured light systems, stereo vision systems, optical interferometry systems, and so forth.

The metric generator module 520 may use the three-dimensional data acquired by the 3D sensors 512(2) to determine a pose of the user 502, determine motion of the user 502, and so forth. For example, the 3D data may indicate that the user 502 is posed in a supine position on a couch.

One or more buttons 512(3) are configured to accept input from the user 502. The buttons 512(3) may comprise mechanical, capacitive, optical, or other mechanisms. For example, the buttons 512(3) may comprise mechanical switches configured to accept an applied force from a touch of the user 502 to generate an input signal. The metric generator module 520 may use data from the buttons 512(3) to determine the activity level of the user 502. For example, the state metric data 522 may generate an operational score based on a number of keystrokes per minute entered by the user 502.

The sensors 512 may include one or more touch sensors 512(4). The touch sensors 512(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The metric generator module 520 may use data from the touch sensors 512(4) to determine activity level of the user 502. For example, the state metric data 522 may generate an operational score based on a number of touches per second.

One or more microphones 512(5) may be configured to acquire information indicative of sound present in the environment. In some implementations, arrays of microphones 512(5) may be used. These arrays may implement beamforming techniques to provide for directionality of gain. The metric generator module 520 may use the one or more microphones 512(5) to acquire audio data that may be indicative of a level of activity of the user 502, the service devices 510, or both. For example, the audio data may be used to determine a current noise level, and categorize one or more of the sounds which have been detected. Continuing the example, the metric generator module 520 may generate an environmental score indicative of a high noise level and sounds associated with a celebration.

One or more weight or pressure sensors 512(6) are configured to measure the weight of a load, such as the user 502 or other objects such as furniture. The weight sensors 512(6) may be incorporated into the flooring of the facility, into furnishings such as couches or chairs, and so forth. The weight sensors 512(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of the weight sensors 512(6) may operate as transducers that generate one or more signals based on an applied force, such as that of the load due to gravity. The metric generator module 520 may use the data acquired by the weight sensors 512(6) to generate an environmental score. For example, output from the weight sensors 512(6) underneath the user 502 while sitting may vary as the user 502 shifts, resulting in a first environmental score.

The sensors 512 may include one or more light sensors 512(7). The light sensors 512(7) may be configured to provide information associated with ambient lighting conditions such as a level of illumination. The data acquisition module 518 may provide environmental data 516 about the level of illumination to the metric generator module 520. For example, information about the level of illumination may be used to generate the profile data 526.

One or more radio frequency identification (RFID) readers 512(8), near field communication (NFC) systems, and so forth, may also be included as sensors 512. The user 502 of the facility may be equipped with one or more radio frequency (RF) tags. The RF tags are configured to emit an RF signal. In one implementation, the RF tag may be a radio frequency identification (RFID) tag configured to emit the RF signal upon activation by an external signal. For example, the external signal may comprise a radio frequency signal or a magnetic field configured to energize or activate the RFID tag. In another implementation, the RF tag may comprise a transmitter and a power source configured to power the transmitter. For example, the RF tag may comprise a Bluetooth® Low Energy (BLE) transmitter and battery. In other implementations, the tag may use other techniques to indicate presence of the tag. For example, an acoustic tag may be configured to generate an ultrasonic signal which is detected by corresponding acoustic receivers. In yet another implementation, the tag may be configured to emit an optical signal.

The data acquisition module 518 may be configured to use the RF tags for one or more of identification of the user 502, determining a location of the user 502, determining a motion of the user 502, and so forth. For example, RF tags may be embedded within the clothing of the user 102 and may be read by the RFID readers 512(8).

One or more RF receivers 512(9) may also be included as sensors 512. In some implementations, the RF receivers 512(9) may be part of transceiver assemblies. The RF receivers 512(9) may be configured to acquire RF signals associated with Wi-Fi™, Bluetooth®, ZigBee®, 3G, 4G, LTE, or other wireless data transmission technologies. The RF receivers 512(9) may provide information associated with data transmitted via radio frequencies, signal strength of RF signals, and so forth. For example, information from the RF receivers 512(9) may be used by the metric generator module 520 to determine an operational score indicative of the amount of wireless traffic associated with a computing device 504 of the user 502, such as a smart phone or tablet.

The sensors 512 may include one or more accelerometers 512(10), which may be worn or carried by the user 502, or affixed to furnishings, and so forth. The accelerometers 512(10) may provide information such as the direction and magnitude of an imposed acceleration. Data such as rate of acceleration, determination of changes in direction, speed, and so forth, may be determined using the accelerometers 512(10). For example, the user 502 may wear a device having one or more accelerometers 512(10), and the environmental data 516 resulting therefrom may be used to generate an environmental score corresponding to a level of physical activity of the user 502.

A gyroscope 512(11) provides information indicative of rotation of an object affixed thereto. For example, the device worn by the user 502 as described above may incorporate a gyroscope 512(11).

A magnetometer 512(12) may be used to determine an orientation by measuring ambient magnetic fields, such as the terrestrial magnetic field. The magnetometer 512(12) may be worn or carried by the user 502. For example, the device worn by the user 502 as described above may incorporate a magnetometer 512(12).

A thermometer 512(13) may provide information indicative of a temperature of an object. For example, a thermometer 512(13) may be incorporated into the device worn by the user 502 as described above. The thermometer 512(13) in this device may be configured to measure ambient air temperature proximate to the user 502, or the body temperature of the user 502. In one implementation the profile module 524 may use the environmental data 516 indicative of temperature from the thermometer 512(13). For example, the profile module 524 may designate periods experiencing lower physical activity by the user 502 as indicated from the accelerometer 512(10) and lower ambient air temperature is indicated by the thermometer 512(13) as being periods of inactivity by the user 502.

One or more biomedical sensors 512(14) are configured to acquire information about the physical state of the user 502 and their associated physiology. For example the biomedical sensors 512(14) may be configured to measure one or more of brain waves, muscle activity, pulse, respiration, galvanic skin response, pupillary dilation, and so forth. Continuing the example, a biomedical sensor 512(14) which detects eye motion may provide environmental data 516 to the profile module 524 to provide input for generation of the profile data 526.

The sensors 512 may include other sensors 512(S) as well. For example, the other sensors 512(S) may include proximity sensors, barometric sensors, hygrometers, biometric input devices, and so forth. Any of the sensors described herein can be used to capture environmental, behavioral or performance metrics.

Output devices 602 may also be provided in the facility, or by the devices therein. The output devices 602 are configured to generate signals which may be perceived by the user 502, detectable by the sensors 512, or a combination thereof.

Haptic output devices 602(1) are configured to provide a signal which results in a tactile sensation to the user 602. The haptic output devices 602(1) may use one or more mechanisms such as electrical stimulation or mechanical displacement to provide the signal. For example, the haptic output devices 602(1) may be configured to generate a modulated electrical signal which produces an apparent tactile sensation in one or more fingers of the user 602. In another example, the haptic output devices 602(1) may comprise piezoelectric or rotary motor devices configured to provide a vibration which may be felt by the user 502.

One or more audio output devices 602(2) are configured to provide acoustic output. The acoustic output includes one or more of infrasonic sound, audible sound, or ultrasonic sound. The audio output devices 602(2) may use one or more mechanisms to generate the acoustic output. These mechanisms may include, but are not limited to: voice coils, piezoelectric elements, magnetorestrictive elements, electrostatic elements, and so forth. For example, a piezoelectric buzzer or a speaker may be used to provide acoustic output.

The display devices 602(3) may be configured to provide output which may be seen by the user 502, or detected by a light-sensitive detector such as a camera 612(1) or light sensor 612(7). The output may be monochrome or color. The display devices 602(3) may be emissive, reflective, or both. An emissive display device 602(3), such as using LEDs, is configured to emit light during operation. In comparison, a reflective display device 602(3), such as using an electrophoretic element, relies on ambient light to present an image. Backlights or front lights may be used to illuminate non-emissive display devices 602(3) to provide visibility of the output in conditions where the ambient light levels are low.

The display mechanisms may include, but are not limited to, micro-electromechanical systems (MEMS), spatial light modulators, electroluminescent displays, quantum dot displays, liquid crystal on silicon (LCOS) displays, cholesteric displays, interferometric displays, liquid crystal displays, electrophoretic displays, and so forth. These mechanisms are configured to emit light, modulate incident light emitted from another source, or both. The display devices 602(3) may operate as panels, projectors, and so forth.

Other output devices 602(T) may also be present. For example, the other output devices 602(T) may include scent/odor dispensers, document printers, three-dimensional printers, and so forth. The output devices 602 can be used as part of a challenge response to be presented to the user. Returning briefly to FIG. 1, the output devices 602 can be controlled by the authentication service 110 after receiving a trigger event. For example, an action 228 of FIG. 2 can be used to control the output devices 602. The sensors 512 can then be used to detect that the action has been performed. Alternatively, the output devices can be used to prompt the user to perform an action as part of the multifactor authentication.

Figure 7:
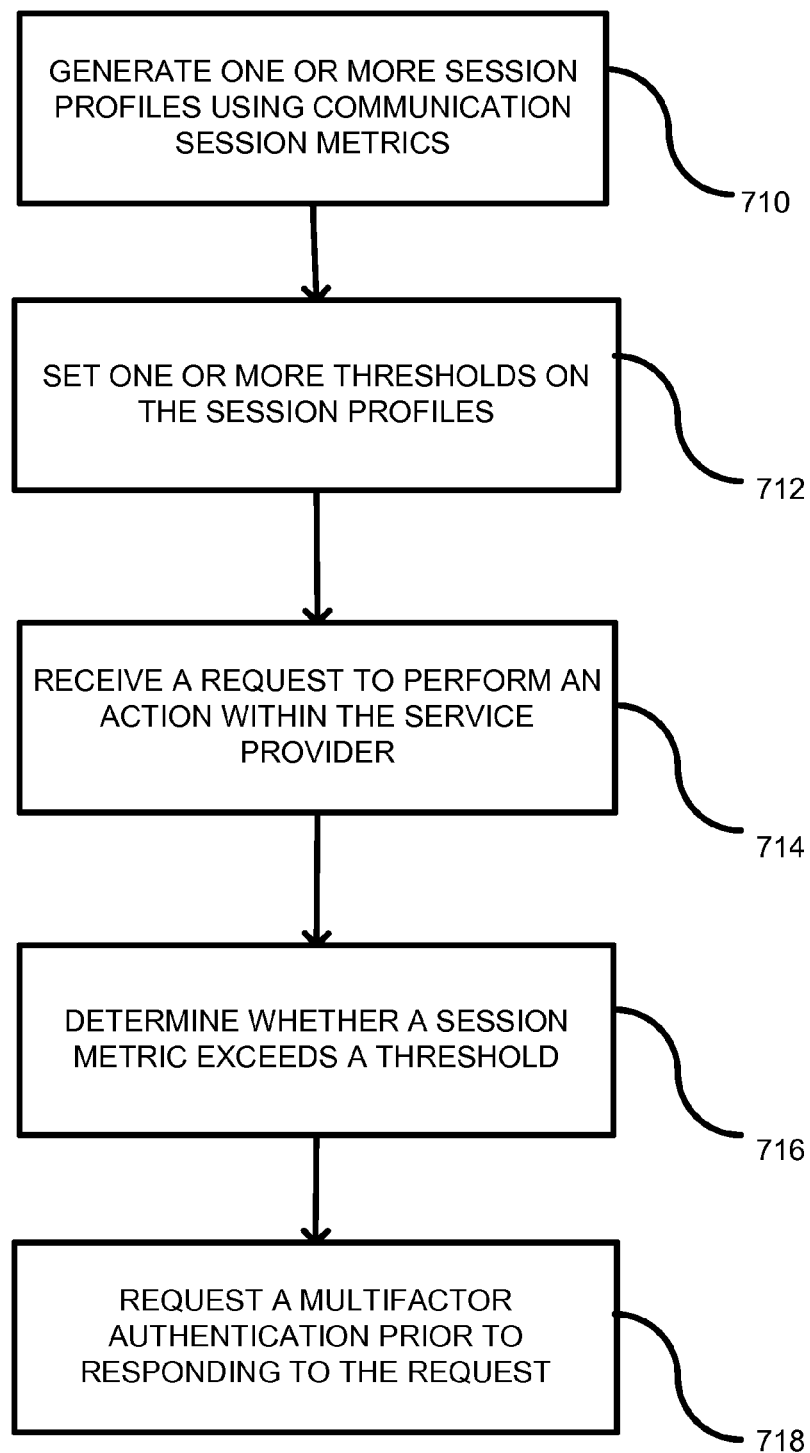
FIG. 7 is a flowchart of a method for requesting multifactor authentication.

FIG. 7 is a flowchart of a method according to one embodiment for requesting multifactor authentication. In process box 710, one or more session profiles can be generated using communication session metrics for previous communication sessions between a user and a service provider. For example, a profiling service (e.g., 140 of FIG. 1 or 524 of FIG. 5) can generate profile data based on a variety of input metrics described herein, such as those shown in FIGS. 1 and 4-6. The session profiles can be based on environmental metrics (e.g., background noise), session performance characteristics (e.g., rendering speed), etc. Other metrics can be used as well, such as previous purchase history. For example, clickstream data can also be used. Clickstream data is the recording of the parts of the screen a computer user clicks on while web browsing or using another software application. As the user clicks anywhere in the webpage or application, the action is logged on a client or inside the web server, as well as possibly the web browser, router, proxy server or ad server.

In process block 712, one or more thresholds can be set for the session profiles. The thresholds represent an acceptable deviation from the session profiles. Example thresholds are shown at 350, 352 in FIG. 3. The generating of the thresholds can be accomplished using a policy input, such as is shown at 170 in FIG. 1. In one example, a mean or average for a profile can be determined over a time range and a percentage deviation from the mean or average can be calculated using well-known techniques. Other techniques for setting the threshold can be used, such as a deviation from a previous maximum or minimum value. In process block 714, a request can be received to perform an action within the service provider. Using the embodiment of FIG. 1 as an example, a request can be received from the client device 112 at the service provider 114. The request can be associated with an action to perform, such as accessing account information, purchasing a product, changing a password, etc. Typically, the request is generated as a result of a clicking operation on a web page. In some embodiments, the action can be included in a list of sensitive actions 172, which requires extra scrutiny. In process block 716, a current session metric is examined and it is determined whether the current session metric exceeds the threshold. By exceeding a threshold, it means that the metric goes outside of a boundary, which can be a positive or negative boundary. Such a determination can be made by comparing the session metrics against the thresholds. Multiple session metrics can be compared against one or more thresholds, if desired. If any of the session metrics exceed a threshold, then in process block 718, a multifactor authentication can be initiated prior to responding to the user's request or otherwise performing an action. Thus, a multifactor authentication can be triggered based on current session metrics as compared against past session metrics. Such a comparison allows for detection of an anomalous condition and justification for a multifactor authentication. An authentication service can then perform the multifactor authentication in any desired manner.

Figure 8:
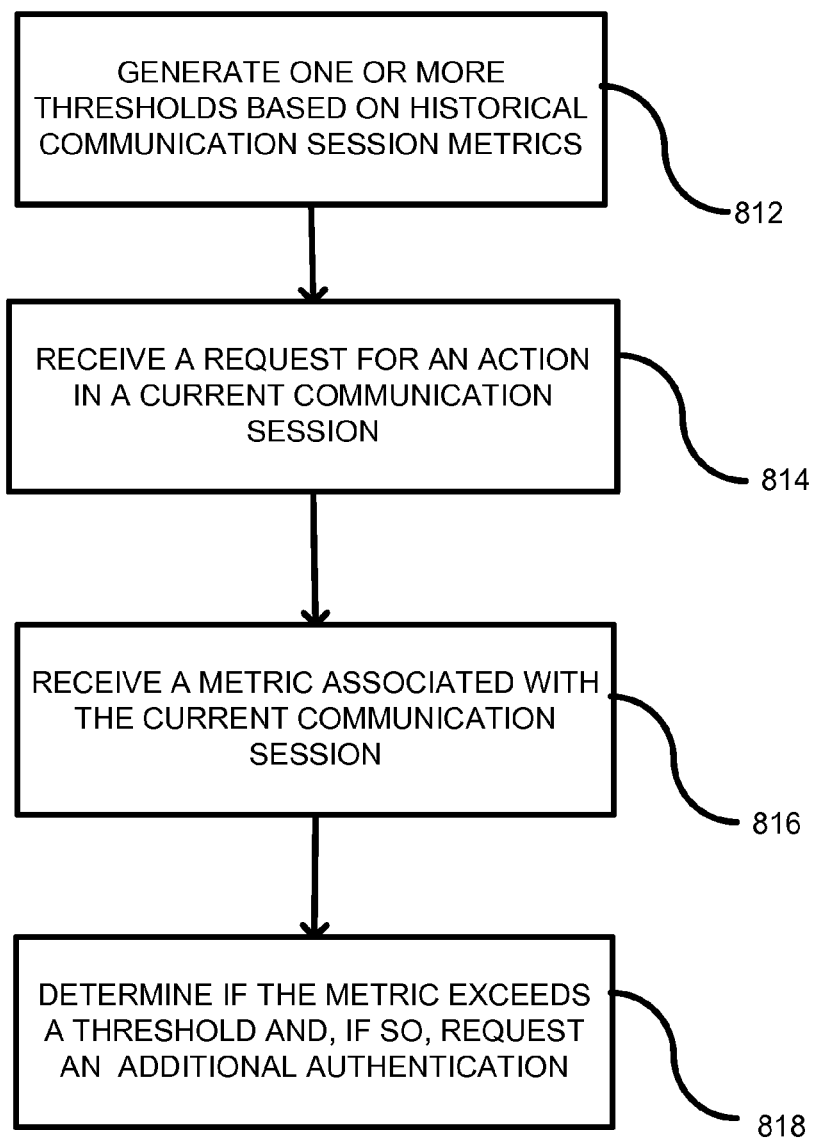
FIG. 8 is a flowchart of a method for requesting multifactor authentication.

FIG. 8 is a flowchart of a method according to another embodiment. In process block 812, one or more thresholds can be generated based on historical communication session metrics. The thresholds can be generated in a number of ways, such as using an acceptable deviation from a previously stored maximum value, or the thresholds can be based on user profiles with an acceptable deviation from a baseline of past metrics for valid communication sessions. In process block 814, a request is received to perform an action in a current authenticated communication session. By being an authenticated communication session, it is meant that authentication already occurred using any of a variety of techniques, such as receiving a password, cookie, token, certificate, etc. Requests are typically generated when a user in a browser application clicks on a link for the purpose of performing an action. The action is typically associated with accessing sensitive data, which is secure information in a user account. In cases where the action is not accessing sensitive data, then the authentication can be avoided and the request can be responded to. Alternatively, authentication can be considered for all requests, if desired. However, considering authentication for all requests can slow the system. Thus, in some embodiments, actions are considered candidate actions if they match a predetermined list, such as is shown at 172 in FIG. 1. In process block 816, a metric is received associated with the current communication session. The metric can be any of the above described metrics including environmental (e.g., ambient noise), behavioral (e.g., clickstream data), and performance metrics (e.g., rendering times). In process block 818, if it is determined that the metric exceeds the threshold, then an additional authentication can be requested, such as by sending an indicator to the authentication service to perform the request. The authentication can be a multifactor authentication or other authentication methods. A challenge request service (e.g., 421 in FIG. 4) and response validation service (e.g., 424) can be used to authenticate the user. If authenticated, then the user action can be completed as requested. Otherwise, the user action can be denied.

Figure 9:
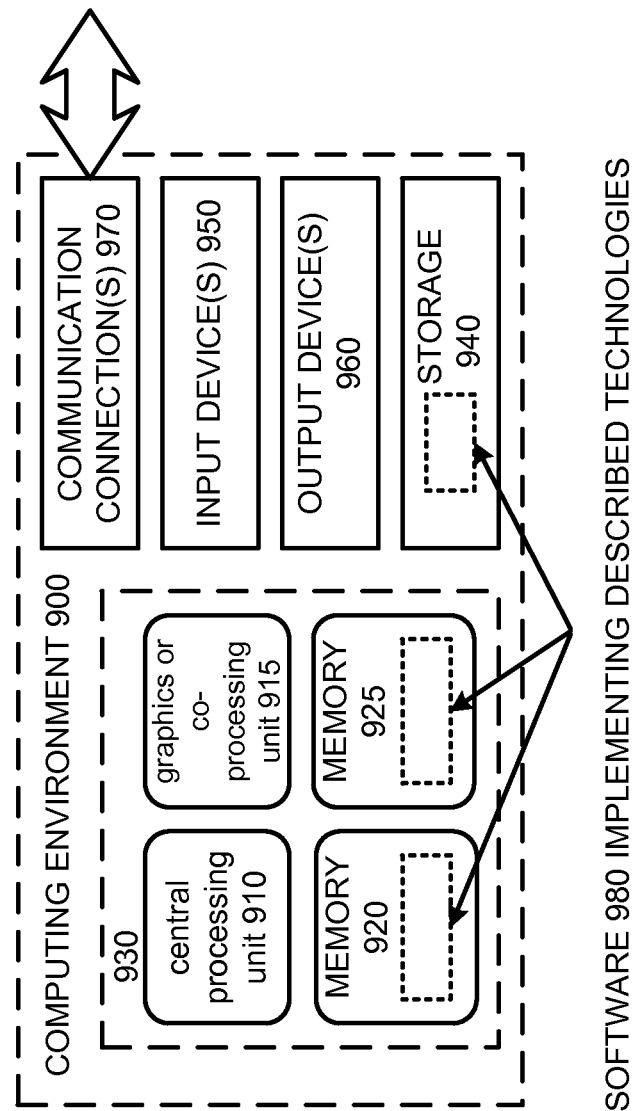
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of determining when to request multifactor authentication, the method comprising:
    generating one or more session profiles using communication session metrics for previous communication sessions between a user, a client device or both, and a service provider;
    setting one or more thresholds representing an acceptable deviation from the one or more session profiles;
    receiving a request from the client device to perform an action within the service provider;
    determining whether a session metric for an active communication session exceeds the one or more thresholds;
    requesting a multifactor authentication for the user prior to responding to the request to perform the action if the session metric exceeds the one or more thresholds; and
    wherein the communication session metrics for the previous communication sessions include session performance characteristics that include rendering speeds for the client device.

2. The method of claim 1, wherein the communication session metrics for the previous communication sessions include one or more of the following: environmental metrics associated with the previous sessions, clickstream data associated with the previous sessions.

3. The method of claim 1, wherein the communication session metrics include purchase history.

4. The method of claim 1, further including causing one or more measurement devices to be transported to a location of the client device in order to capture the session metric.

5. A computer-readable storage medium including instructions that upon execution cause a computer system to:
    generate one or more thresholds for a client communication session with a service provider, the one or more thresholds being based on historical communication session metrics;
    receive a request for a client action in a current authenticated communication session with the service provider;
    receive a metric associated with the current authenticated communication session, wherein the metric is associated with rendering speeds for previous client communication sessions; and
    determine if the metric exceeds the one or more thresholds, and, if so, request an authentication prior to responding to the request.

6. The computer-readable storage medium according to claim 5, wherein the instructions, upon execution, further cause the computer system to:
    generate a profile based on the historical communication session metrics;
    wherein generating the one or more thresholds includes determining a deviation from an average of the profile.

7. The computer-readable storage medium according to claim 5, wherein the request of the authentication includes requesting the user to provide information regarding a wireless access point near a location of a user making the request.

8. The computer-readable storage medium according to claim 7, wherein the instructions, upon execution, further cause the computer system to:
    cause a mobile wireless access point to be transported to a user's location so that the user can access the wireless access point.

9. The computer-readable storage medium according to claim 8, wherein the transport of the mobile wireless access point includes using a ground vehicle or an unmanned aerial vehicle.

10. The computer-readable storage medium according to claim 5, wherein the instructions, upon execution, further cause the computer system to:
    only perform the determination if the action is a candidate action for the authentication.

11. The computer-readable storage medium according to claim 5, wherein the instructions, upon execution, further cause the computer system to:
    wherein the action is a request to access secure information associated with a user account with the service provider.

12. The computer-readable storage medium according to claim 5, wherein the metric includes an environmental metric associated with the communication session.

13. The computer-readable storage medium according to claim 12, wherein the environmental metric includes an ambient noise level associated with the communication session.

14. The computer-readable storage medium according to claim 5, wherein the metric includes behavioral information associated with a user making the request.

15. The computer-readable storage medium according to claim 5, wherein the metric includes session performance characteristics for the previous sessions.

16. The computer-readable storage medium according to claim 15, wherein the session performance characteristics include rendering times on a client device from which the action is received.

17. The computer-readable storage medium according to claim 5, wherein the instructions, upon execution, further cause the computer system to:
receive a user authentication prior to receiving the action.

18. A system for requesting authentication, comprising:
a monitoring service for capturing metrics between a client device and a service provider, wherein the captured metrics include session performance characteristics associated with rendering speeds for the client device;
a profiling service coupled to the monitoring service for generating a user profile based on the captured metrics, the profiling service setting one or more thresholds of an acceptable deviation from the captured metrics; and
an authentication service coupled to the profiling service, the authentication service for requesting additional authentication in response to the profiling service detecting a deviation in the captured metrics from typical metrics.

19. The system of claim 18, wherein the captured metrics include one or more of the following: environmental metrics associated with an environment of the client device or behavioral metrics associated with behavior patterns of the client device.

* * * * *